United States Patent
Walters (10) Patent No.: US 9,734,923 B2
(45) Date of Patent: Aug. 15, 2017

(54) NUCLEAR FUEL ASSEMBLY HAVING A SPACER GRID WITH ONE OR MORE SEAMLESS CORNERS

(71) Applicant: Westinghouse Electric Company LLC, Cranberry Township, PA (US)

(72) Inventor: Jason A. Walters, Lexington, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1227 days.

(21) Appl. No.: 13/922,629

(22) Filed: Jun. 20, 2013

(65) Prior Publication Data
US 2014/0376681 A1    Dec. 25, 2014

(51) Int. Cl.
G21C 3/352    (2006.01)
G21C 3/356    (2006.01)

(52) U.S. Cl.
CPC ............ G21C 3/352 (2013.01); G21C 3/356 (2013.01); Y02E 30/40 (2013.01)

(58) Field of Classification Search
CPC ............................... G21C 3/352; G21C 3/356
USPC .................................................. 376/438, 462
See application file for complete search history.

(56) References Cited

U.S. PATENT DOCUMENTS 4,803,043 A * 2/1989 DeMario ............ G21C 3/3563
                                                    376/438
4,873,051 A * 10/1989 Duncan ................ G21C 3/3424
                                                    376/438

FOREIGN PATENT DOCUMENTS

EP    0291736 A2    11/1988
JP    60-228990   * 11/1985
JP    S60228990     11/1985

OTHER PUBLICATIONS

Westinghouse Electric Company LLC, FR 14 55118 Preliminary Search Report, Feb. 29, 2016, 5 pages.

* cited by examiner

*Primary Examiner* — Jack W Keith
*Assistant Examiner* — Daniel Wasil
(74) *Attorney, Agent, or Firm* — Eckert Seamans Cherin & Mellot, LLC; Daniel C. Abeles (57) ABSTRACT

A nuclear fuel assembly grid that has fuel rod support features that take up a substantial portion of the width of the corner fuel rod support cells. The nuclear fuel assembly grid has an outer strap that is joined around a corner of the grid to another outer strap segment and a mating inner strap end at the intersection with the inner strap. The juncture accommodates the width of the rod support feature, enables grid-to-grid anti-snag capabilities and facilitates the use of longitudinal feed materials and dies.

20 Claims, 9 Drawing Sheets

NUCLEAR FUEL ASSEMBLY HAVING A SPACER GRID WITH ONE OR MORE SEAMLESS CORNERS

BACKGROUND

1. Field

This invention pertains generally to nuclear reactor fuel assemblies and more particularly to a nuclear fuel assembly that employs a spacer grid having one or more seamless corners.

2. Description of Related Art

In most pressurized water nuclear reactors (PWRs), the reactor core is comprised of a large number of elongated fuel assemblies that generate the reactive power of the reactor. These fuel assemblies typically include a plurality of fuel rods held in an organized array by a plurality of grids spaced axially along the fuel assembly length and attached to a plurality of elongated thimble tubes of the fuel assembly. The thimble tubes typically receive control rods or instrumentation therein. Top and bottom nozzles are on opposite ends of the fuel assembly and are secured to the ends of the thimble tubes that extend slightly above and below the ends of the fuel rods.

The grids, as is known in the relevant art, are used to precisely maintain the spacing and support between the fuel rods in the reactor core, provide lateral support for the fuel rods and induce mixing of the coolant. One type of conventional grid design includes a plurality of interleaved straps that together form an egg-crate configuration having a plurality of roughly square cells which individually accept the fuel rods therein. Depending upon the configuration of the thimble tubes, the thimble tubes can either be received in cells that are sized the same as those that receive fuel rods therein, or in relatively larger thimble cells defined in the interleaved straps. The interleaved straps provide attachment points to the thimble tubes, thus enabling positioning of the grids at spaced locations along the length of the fuel assembly.

The straps are configured such that the cells through which the fuel rods pass each include one or more relatively compliant springs and a plurality of relatively rigid dimples which cooperate to form the fuel rod support feature of the grid. The springs and dimples may be formed in the middle of the interleaved straps and protrude outwardly therefrom into the cells through which the fuel rods pass. The springs and dimples of each fuel rod cell then contact the corresponding fuel rod extending through the cell. Outer straps of the grid are attached together and peripherally enclose the inner straps of the grid to impart strength and rigidity to the grid and define individual fuel rod cells around the perimeter of the grid. The inner straps are typically welded or braised at each intersection and the inner straps are also welded or braised to the peripheral or outer straps defining the outer perimeter of the assembly.

At the individual cell level, the fuel rods support is normally provided by the combination of rigid support dimples and flexible springs as mentioned above. There are many variations to the spring-dimple support geometry that have been used or are currently in use, including diagonal springs, "I" shaped springs, cantilevered springs, horizontal and vertical dimples, etc. The number of springs per cell also varies. The typical arrangement is two springs and four dimples per cell. The geometry of the dimples and springs needs to be carefully determined to provide adequate rod support through the life of the assembly.

During irradiation, the initial spring force relaxes more or less rapidly, depending on the spring material and irradiation environment. The cladding diameter also changes as a result of the very high coolant pressure and operating temperatures and the fuel pellets inside the rod also change their diameter by densification and swelling. The outside cladding diameter also increases, due to the formation of an oxide layer. As a result of these dimensional and material property changes, maintaining adequate rod support through the life of the fuel assembly is very challenging.

Under the effect of axial flow and cross flow induced by thermal and pressure gradients within the reactor and other flow disturbances, such as standing waves and eddies, the fuel rods, which are slender bodies, are continuously vibrating with relatively small amplitudes. If the rod is not properly supported, this very small vibration amplitude may lead to relative motion between the support points and the cladding. If the pressure exerted by the sliding rod on the relatively small dimple and grid support surfaces is high enough, the small corrosion layer on the surface of the cladding can be removed by abrasion, exposing the base metal to the coolant. As a new corrosion layer is formed on the exposed fresh cladding surface, it is also removed by abrasion until ultimately the wall of the rod is perforated. This phenomenon is known as corrosion fretting and in 2006 it was the leading cause of fuel failures in PWR reactors.

Support grids also provide another important function in the fuel assembly, that of coolant mixing to decrease the maximum coolant temperature. Since the heat generated by each fuel rod is not uniform, there are thermal gradients in the coolant. One important parameter in the design of the fuel assemblies is to maintain the efficient heat transfer from the fuel rods to the coolant. The higher the amount of heat removed per unit time, the higher the power being generated. At high enough coolant temperatures, the rate of heat that can be removed per unit of cladding area in a given time decreases abruptly in a significant way. This phenomenon is known as deviation from nucleate boiling or DNB. If within the parameters of reactor operation, the coolant temperature would reach the point of DNB, the cladding surface temperature would increase rapidly in order to evacuate the heat generated inside the fuel rod and rapid cladding oxidation would lead to cladding failure. It is clear that DNB needs to be avoided to prevent fuel rod failures. Since DNB, if it occurs, takes place at the point where the coolant is at its maximum temperature, it follows that decreasing the maximum coolant temperature by coolant mixing within the assembly permits the generation of larger amounts of power without reaching DNB conditions. Normally, the improved mixing is achieved by using mixing vanes in the down flow side of the grid structure. The effectiveness of mixing is dependent upon the shape, size and location of the mixing vanes relative to the fuel rod.

Other important functions of the grid include the ability to sustain handling and normal operation at anticipated accident loads without losing function and to avoid "hot spots" on the fuel rods due to the formation of steam pockets between the fuel rods and the support points, which may result when not enough coolant is locally available to evacuate the heat generated in the fuel rod. Steam pockets cause overheating of the fuel rod to the point of failure by rapid localized corrosion of the cladding.

Maintaining a substantially balanced coolant flow through the fuel assemblies across the core is a desirable objective to maintain substantially uniform heat transfer. Any changes in fuel assembly design can alter the pressure drop and effect the relative balance in flow resistance through the core among the various types of fuel assemblies. Changes in grid design that reduce pressure drop are desirable because such changes enable a fuel assembly designer to introduce other improvements that will restore the pressure drop equilibrium among fuel assemblies and improve other dynamics of the grid, such as mixing.

It is thus desired to provide an improved grid that exhibits a reduced pressure drop and better heat transfer and is less complicated and less costly to manufacture.

SUMMARY

The foregoing objectives are achieved employing a new nuclear fuel assembly having a parallel, spaced array of a plurality of elongated nuclear fuel rods supported between a lower nozzle and an upper nozzle and a plurality of spaced support grids arranged in tandem along the axial length of the fuel rods between the upper nozzle and the lower nozzle. The support grids at least partially enclose an axial portion of the circumference of each fuel rod within a corresponding support cell to maintain a lateral spacing between the rods. At least one of the support grids includes a plurality of elongated, interior intersecting straps that define interior ones of the support cells at the intersection of each of four adjacent straps that surround the nuclear fuel rods passing through the interior support cells. A length of each strap along its elongated dimension, forms a wall of the corresponding support cell, with at least one side of the support grid having an outer wall of each of an outer row of support cells on a first side, on a second side, on a third side and on a fourth side of the support grid formed from a continuous length of a bordering strap covering at least one of the first side, the second side, the third side and the fourth side of the support grid. The continuous length of the bordering strap covering the at least one of the first side, the second side, the third side and the fourth side of the support grid has a first and second end, with the first end and the second end of the bordering strap respectively covering adjacent sides of the support grid, overlapping adjacent a corner of the support grid to form an overlapping section that is joined to an end of one of the interior intersecting straps.

In one embodiment, the bordering strap covering at least one of the first side, the second side, the third side and the fourth side of the support grid is one continuous strap with the first and second end. In another embodiment, the bordering strap covering the first side and the second side is formed from one continuous strap, referred to as the first strap, and the bordering strap covering the third side and the fourth side is formed from one continuous strap referred to as the second strap. Both the first strap and the second strap have a first and second end with the first end of the first strap overlapping the second end of the second strap and the second end of the first strap overlapping the first end of the second strap adjacent opposing corners of the grid. Preferably, the bordering strap includes anti-snag projections that extend from the top and bottom of the bordering strap at regular intervals between fuel rod support features which are generally centered on the width of the outer wall of the outer row of support cells, except one of the first and second ends has no anti-snag projections in the overlapping section.

In one embodiment, a first end of the bordering strap is provided with two spaced lateral cuts that are spaced along a height of the first end, with the cuts defining three tabs with a center tab wider than the upper and lower tabs. Preferably, the upper and lower tabs are substantially of the same height and each of the upper, lower and center tabs has a vertical bend line with the vertical bend line of the upper and lower tabs substantially equidistant from an intersection of the interior strap closest to the first end and the vertical bend line of the center tab further distant from that intersection than the upper and lower tabs. The second end may also include a generally "U"-shaped notch along its height that is substantially in line with the center tab. Desirably, the "U"-shaped notch in the second end has a lateral depth substantially equal to the width of the center tab from the first end to the bend line.

In at least one of the embodiments, an upper and lower edge of a portion of the overlapping section at the second end adjacent where the bordering strap extends around the corner, has an upright and inverted generally "V"-shaped cut that is substantially centered at the corner. Preferably, the bordering strap includes fuel rod support features generally centered on a width of the outer wall of the outer row of the support cells, except that the distance between the adjacent fuel rod support features at the one of the first and second end that is part of the overlapping section is smaller than the distance between other of the fuel rod support features.

The invention also contemplates a spacer grid with the above features.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 1:
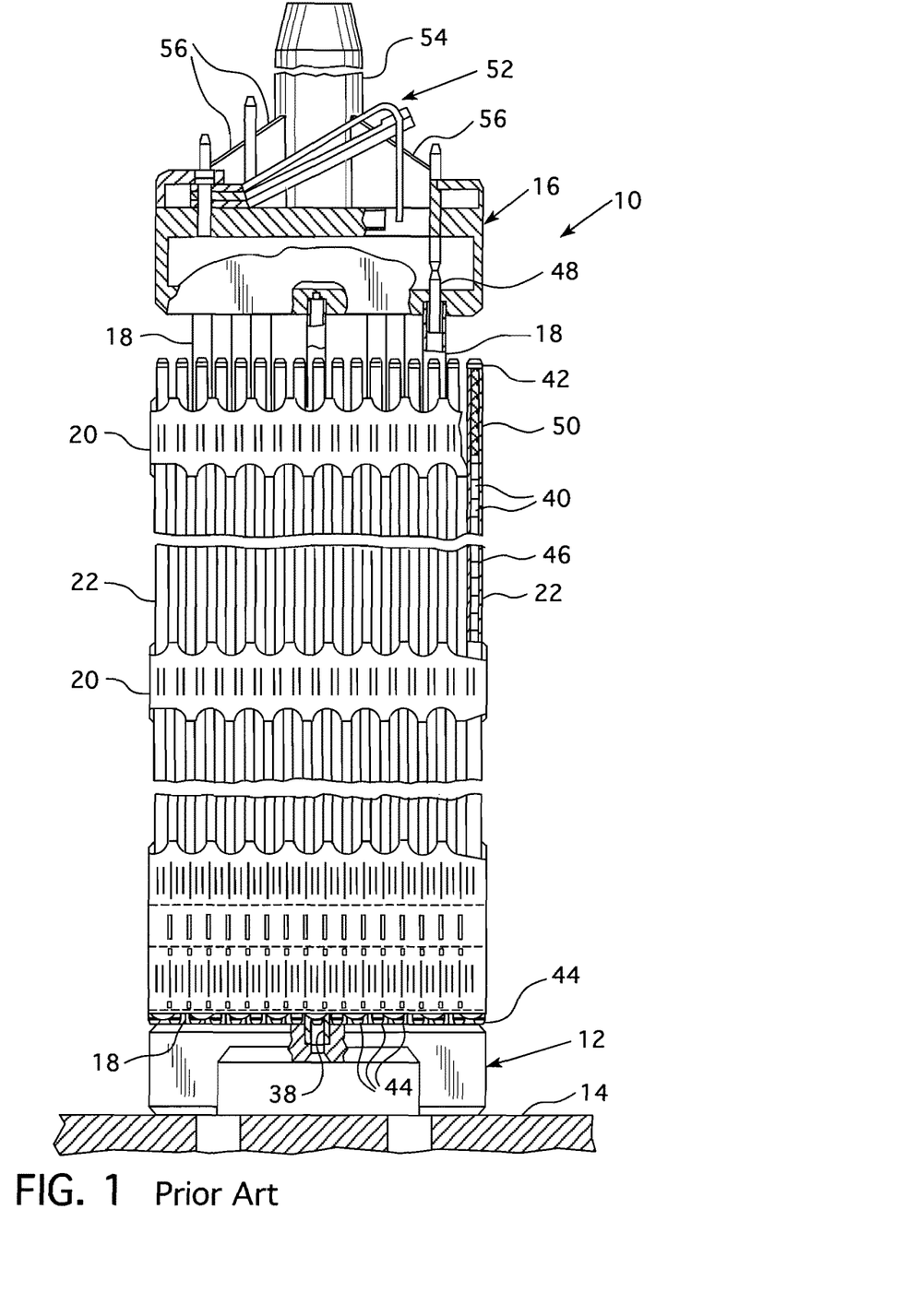
FIG. 1 is an elevational view, partially in section, of a fuel assembly illustrated in vertically shortened form, with parts broken away for clarity.

FIG. 1 is an elevational view, represented in vertically shortened form, of a fuel assembly being generally designated by reference character 10. The fuel assembly 10 is the type used in a pressurized water reactor and has a structural skeleton which, at its lower end includes a bottom nozzle 12. The bottom nozzle 12 supports the fuel assembly 10 on a lower core plate 14 in a core region of the nuclear reactor. In addition to the bottom nozzle 12, the structural skeleton of the fuel assembly 10 also includes a top nozzle 16 at its upper end and a number of guide tubes or thimbles 18 which align with guide tubes in the upper internals of the reactor. The guide tubes or thimbles 18 extend longitudinally between the bottom and top nozzles 12 and 16 and at opposite ends are rigidly attached thereto.

Figure 2:
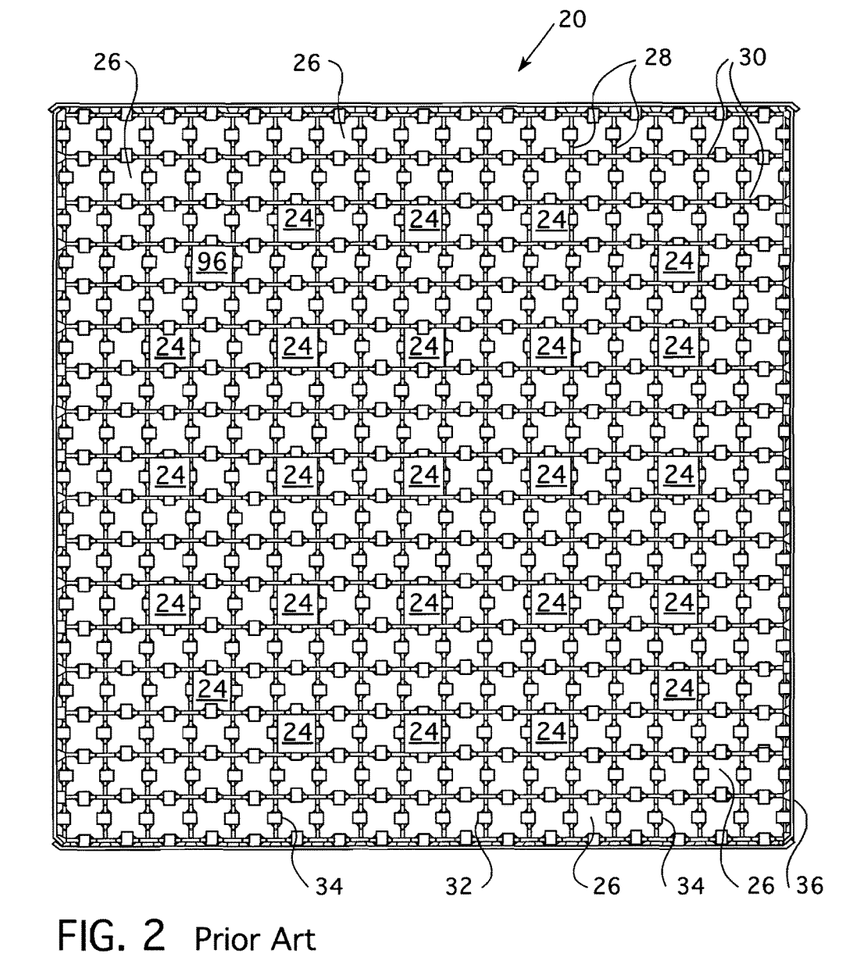
FIG. 2 is a plan view of a conventional egg-crate support grid for application to a traditional PWR fuel assembly such as is shown in FIG. 1.

The fuel assembly 10 further includes a plurality of transverse grids 20 axially spaced along and mounted to the guide thimbles 18 and an organized array of elongated fuel rods 22 transversely spaced and supported by the grids 20. A plan view of a conventional grid 20 without the guide thimbles 18 and fuel rods 22 is shown in FIG. 2. The guide thimbles 18 pass through the cells labeled 24 and the fuel rods 22 occupy the remaining cells 26 except for the center cell 24 which is reserved for an instrument thimble 38 (shown in FIG. 1). As can be seen from FIG. 2, the grids 20 are conventionally formed from an array of orthogonal straps 28 and 30 that are interleaved in an egg-crate pattern with the adjacent interface of four straps defining approximately square support cells through which the fuel rods 22 are supported in the cells 26 in transverse, spaced relationship with each other. In many designs, springs 32 and dimples 34 are stamped into opposite walls of the straps 28 and 30 that form the support cells 26. The springs and dimples extend radially into the support cells and capture the fuel rods 22 therebetween; exerting pressure on the fuel rod cladding to hold the rods in position. The orthogonal array of straps 28 and 30 is welded at each strap end to a bordering strap 36 to complete the grid structure 20. In the prior art embodiment shown in FIG. 2, the bordering strap 36 is formed from four separate straps welded together at the corners. Also, as previously mentioned the assembly 20, as shown in FIG. 1, has an instrumentation tube 38 located in the center thereof that extends between and is captured by the bottom and top nozzles 12 and 16. With such an arrangement of parts, fuel assembly 10 forms and integral unit capable of being conveniently handled without damaging the assembly of parts.

As mentioned above, the fuel rods 22 in the array thereof in the assembly 10 are held in spaced relationship with one another by the grids 20 spaced along the fuel assembly length. As shown in FIG. 1 each fuel rod 22 includes the plurality of nuclear fuel pellets 40 and is closed at its opposite ends by upper and lower end plugs 42 and 44. Commonly, a plenum spring 50 is disposed between the upper end plug 42 and the pellets 40 to maintain the pellets in a tight stacked relationship within the rod 22. The fuel pellets 40, composed of fissile material, are responsible for creating the reactive power of the nuclear reactor. A liquid moderator/coolant, such as water or water containing boron, is pumped upwardly through the fuel assemblies of the core in order to extract heat generated therein for the production of useful work. The cladding 46 which surrounds the pellets 40 functions as a barrier to prevent the fission byproducts from entering the coolant and further contaminating the reactor system.

To control the fission process, a number of control rods 48 are reciprocally moveable in the guide thimbles 18 located at predetermined positions in the fuel assembly 10. The guide thimble locations 24 can be specifically seen in FIG. 2, except for the center location which is occupied by the instrumentation tube 38. Specifically, a rod cluster control mechanism 52, positioned above the top nozzle 16, supports a plurality of the control rods 48. The control mechanism has an internally threaded cylindrical hub member 54 with a plurality of radially extending flukes or arms 56 that form a configuration commonly known as a spider. Each arm 56 is interconnected to a control rod 48 such that the control rod mechanism 52 is operable to move the control rods vertically in the guide thimbles 18 to thereby control the fission process in the fuel assembly 10, under the motive power of a control rod drive shaft which is coupled to the control rod hub 54, all in a well known manner.

Advanced fuel rod support features on the spacer grids' outer straps can prevent the use of conventional manufacturing processes which typically welded the outer spacer grid straps together at the grid's corners as illustrated in FIG. 2. This limits the outer spacer grid strap design to bent corners that pose a unique manufacturing obstacle when longitude material and dies are employed. As explained hereafter, using longitudinal feed material and dies have several advantages over the use of transverse feeder material and dies. Historically, bent grid corners have only been possible with transverse material utilizing "wide strip" dies. This invention now makes it possible to manufacture bent grid corners with longitudinal material/dies without sacrificing rod support, strength or fuel assembly grid-to-grid anti-snag capabilities.

To manufacture an outer strap with a bent corner, the pitch/spacing between fuel rod support features must be decreased for the pitch that spans into the corner bend. This is necessary since less material between the rod supports are required through the bend so that the support features correctly align with the fuel rod position. The manufacture of this strap style is currently only possible utilizing wide strip progressive dies which allow the pitch to be adjusted between the support features at any location within the outer strap.

The use of wide strip progressive dies for this style of outer strap, i.e., a strap with bent corners, require the use of a transverse material direction that uses long coils of feeder material. The feeder material is wider than the outer strap is long and the die requires separate and unique stations to cut and form each feature on the strap. This results in multiple sets of the same tooling to be placed at each pitch of the die. Since the outer strap is fabricated from a transverse material, the inner spacer grid straps must also be fabricated using a transverse material, and corresponding wide strip dies for high production quantities. It is necessary to fabricate both the inner and outer straps with feeder material processed (rolled) in the same direction, i.e., transverse, due to other spacer grid performance considerations.

Utilizing transverse material and wide strip dies is not always preferred. The dies are typically more expensive to build, maintain and require more adjustments. The feeder material can also have more variability in material thickness due to its width and the position it was cut from the master coil. The variation in feeder material may require even more die adjustments each time a different coil is used.

Utilizing longitudinal material allows many of the difficulties associated with wide strip dies to be mitigated. Instead of the feeder material being the same width as the strap is long, it is now much narrower. Longitudinal feeder material is typically slightly wider than the strap width. Additionally, longitudinal dies use the same tooling to produce repeating features, i.e., rod support features, etc. Longitudinal dies typically do not allow the pitch to vary (as needed across the corner bends) within the strap. The concepts presented here allow a corner bend to be produced on a longitudinal die.

As previously mentioned, advanced fuel rod support features are on the spacer grid outer straps 36 can require additional corner support cell wall width that encroaches on the grid's corner. When this occurs, employing conventional manufacturing techniques, the spacer grid outer strap must be bent instead of welded. The "bent" corner poses a unique obstacle when longitudinal material/dies are employed.

Figure 3:
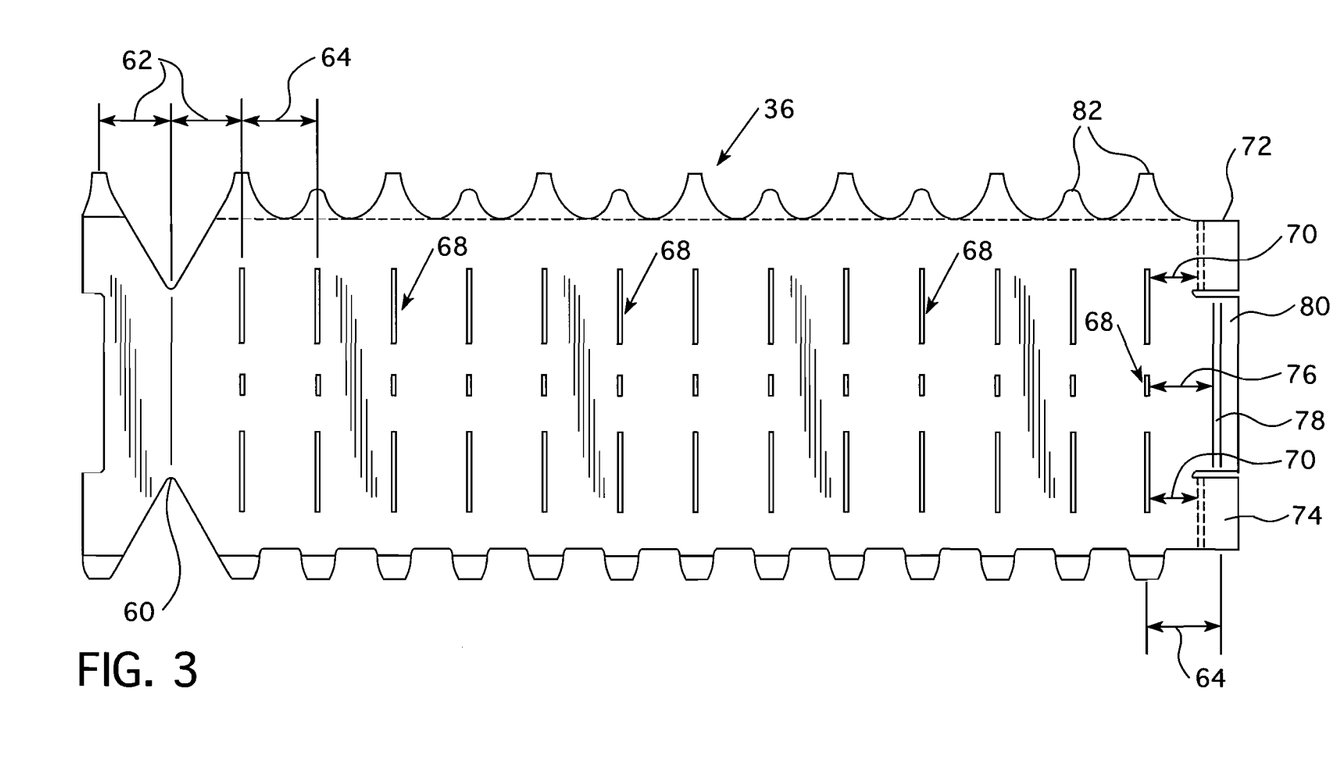
FIG. 3 is a side view of one side of a border strap constructed in accordance with one embodiment of this invention.
Figure 4A:
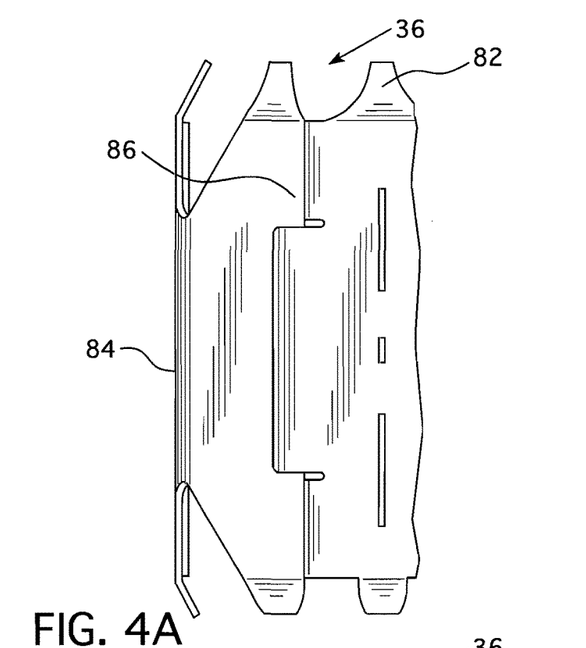
FIG. 4A is a side view of one corner of the grid border strap constructed in accordance with one embodiment of this invention.
Figure 4B:
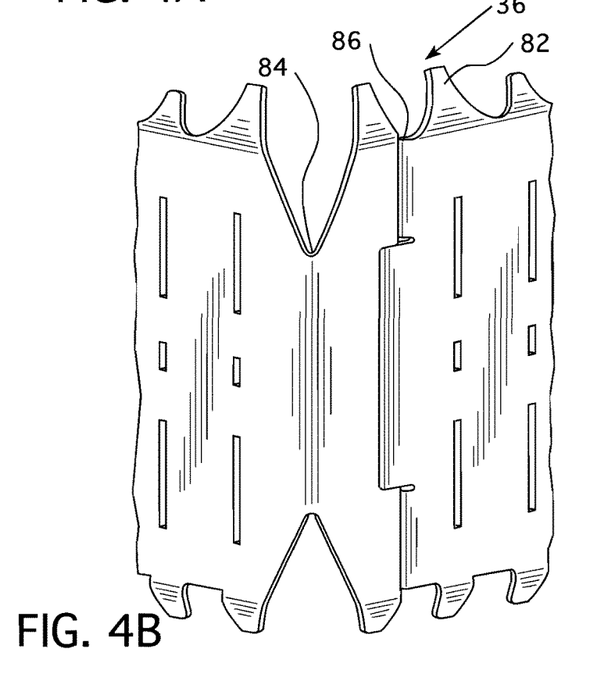
FIG. 4B is a perspective view of the corner of the grid strap shown in FIG. 4A with the corner rotated into center view.
Figure 4C:
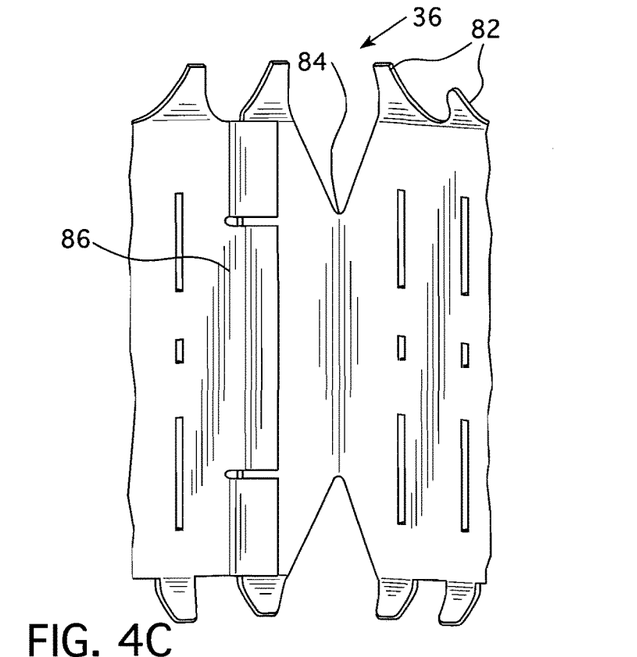
FIG. 4C is a side view of the inside of the joint between grid border strap illustrated in FIGS. 4A and 4B.
Figure 4D:
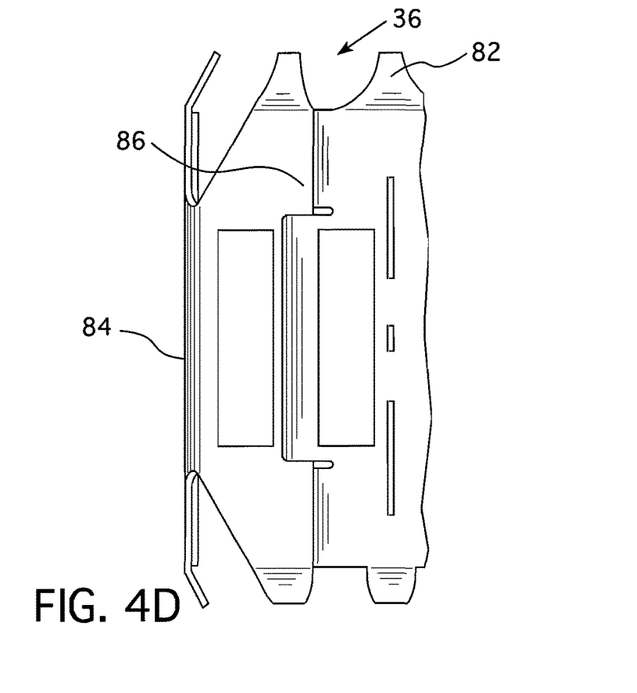
FIGS. 4D, 4E and 4F respectfully correspond to the views illustrated in FIGS. 4A, 4B and 4C with rectangular boxes illustrating approximately where the rod support features would be located.
Figure 4E:
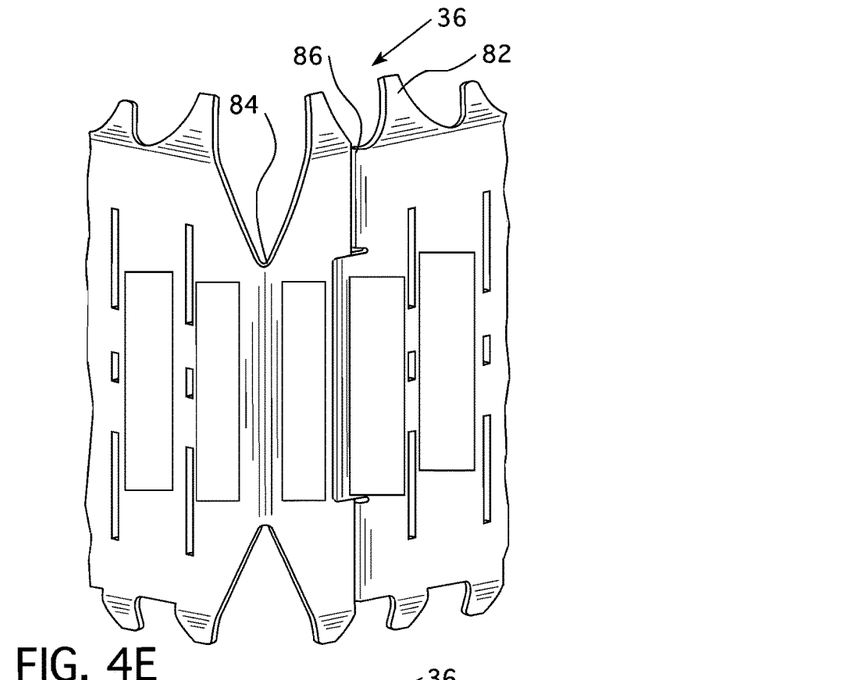
Figure 4F:
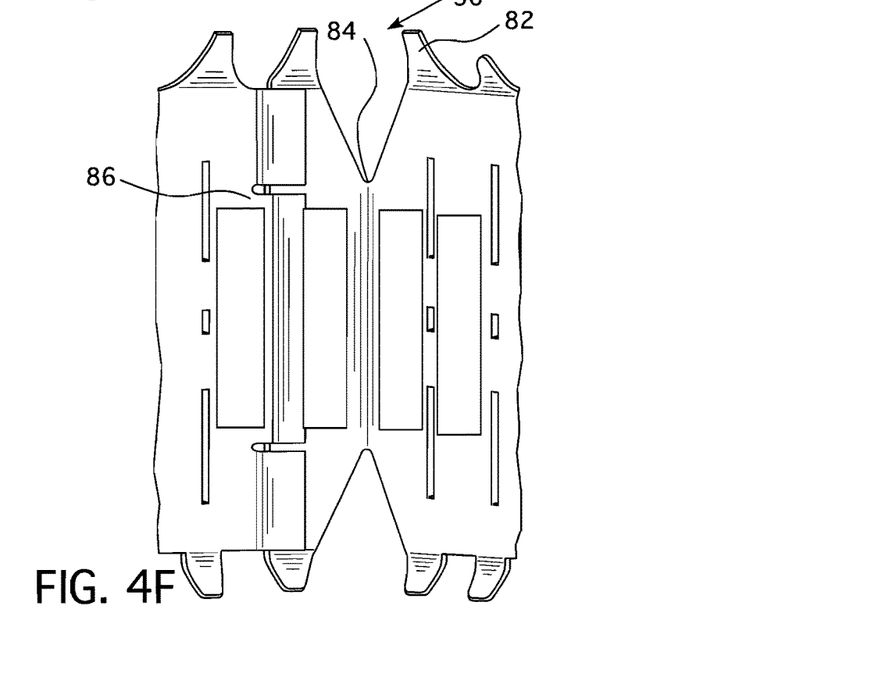
Figures 5A, 5C:
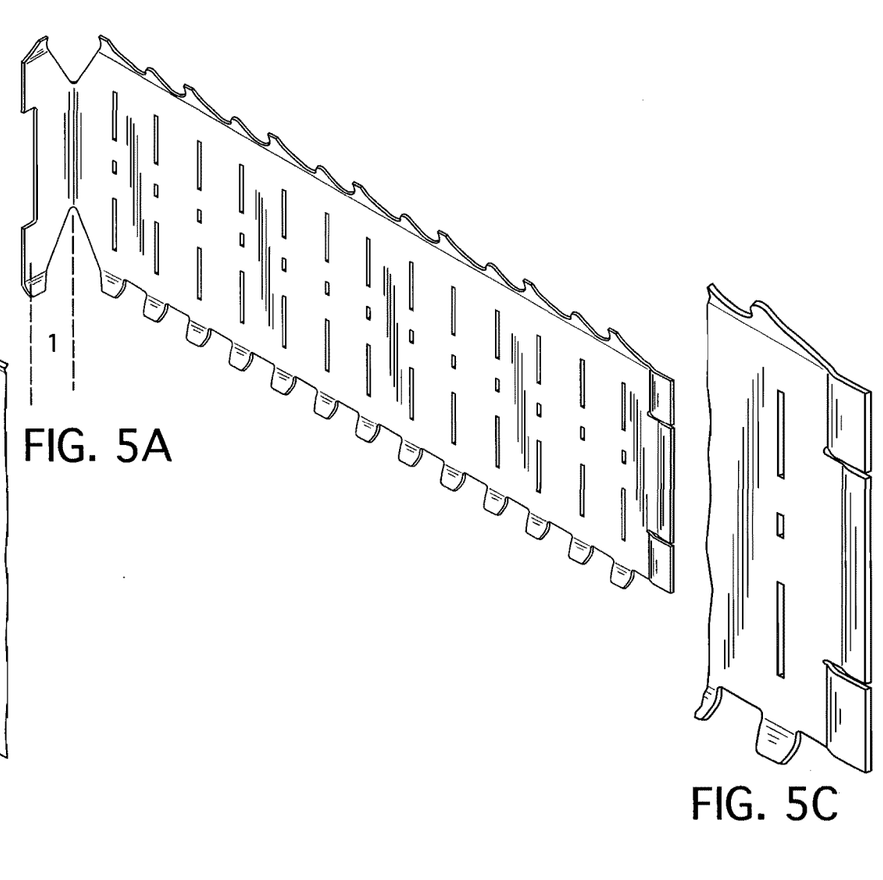
FIG. 5A is a perspective view of one side of one embodiment of the bordering strap of this invention with a corner of the first end bent at 90 degrees and FIGS. 5B and 5C are in large views of the first and second ends of the bordering strap shown in FIG. 5A.

FIG. 3 is a side view of an unbent border strap 36 that extends over a little more than one quarter of the entire grid perimeter, where the border strap bends around a corner at the bend line 60 so that it does not interfere with the additional width required by advanced fuel rod support features. FIG. 5A shows what the border strap of FIG. 3 looks like with the corner bent. FIG. 3 identifies the areas where the pitch changes and the bends (jogs) of the opposing strap pitch occur (note that the rod support features are omitted from the view). Dimension 62 represents the decreased pitch that is required when bending the strap, while dimension 64 represents the pitch required for the remaining cells. Dimension 62 may be in the order of 0.535 in. (1.36 cm.) and dimension 64 may be in the order of 0.568 in (1.44 cm.). Dimension 62 also spans from the bend line 60 to the left at the center of vane's U-shaped opening. The difference in the dimensions 62 and 64 is slight, but is necessary to assure the proper location of the fuel rod support relative to the rod. Note that the said of three collinear vertical lines 68 repeating within FIG. 3 represent the locations where mating inner straps 28 and 30 join to the outer strap 36. Dimension 70 represent the distance the upper and lower tabs 72 and 74 are spaced from the closest inner strap mating location 68 and dimension 76 represents the extended distance of the center jog, i.e., bend line 78, from the closest inner strap mating location 68. Note that the spacing 70 is less than the spacing 76. The center tab 80, spaced by dimension 76 is offset adequately to allow a rod support feature to be placed in the zone created by dimension 76. The upper and lower tabs 72 and 74 are greater in length in the elongated direction of the strap 36, than the center tab 80 to allow overlap of the opposing strap edge that carries the upper and lower anti-snag spacer grid features 82. FIGS. 4A through 4F illustrate multiple views of two outer straps that are mated just around the grid corner 84 at the juncture 86. FIG. 4A shows an outside joint view from the side of the grid at the corner. FIG. 4B shows the joint 86 illustrated in FIG. 4A rotated so the view is directly at the corner. FIG. 4C is a view of the corner from inside the grid strap. The rod support features have been omitted from FIGS. 4A, 4B and 4C for convenience. The general location of the rod support features are indicated by the rectangles in FIGS. 4D, 4E and 4F.

Figure 5B:
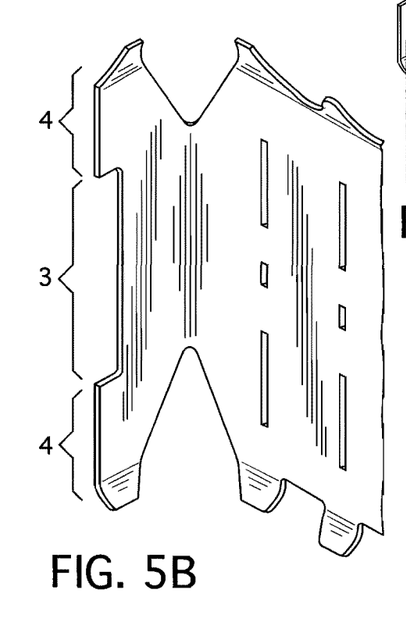

In one preferred embodiment, the bordering strap 36 is constructed from four separate straps configured as illustrated in FIG. 3 and joined around the corners as illustrated in FIG. 4. However, the bordering strap can be made as a single length that extends around two or more sides and still benefit from the style of coupling juncture 86 called for by this invention, however, if the strap length includes a bend other than at an end of the strap then wide strip progressive dies would need to be employed to accommodate the varying spacing of the rod support features at the integral corner. Even where wide strip progressive dies are required, e.g., where the bordering strap is formed in two sections, this invention enables the use of narrower rolls of feeder material and the same equipment can be used to produce both sections off the strap. FIGS. 5A, 5B and 5C show the primary features that allow the longitudinal strap to be fabricated on a longitudinal narrow strip die. To fabricate the bent corner strap without sacrificing function, the strap is placed one pitch from the edge of the die (1), i.e., the bend 60 is placed one pitch 62 from either adjacent inner strap mating location. This would be equivalent to a distance from the end of one strap edge that is one pitch 62 plus some additional amount to allow for welding and creating the anti-snag features 82. This allows the reduced pitch cell i.e., the corner cell, to be formed and cut during the final operations as the strap exits the die, allowing the die to produce a variable pitch strap. Secondly (2), the opposite edge has three tabs where the center tabs bend (jog) location is extended closer to the strap edge relative to the two remaining tabs. The extension creates clearance to place the rod support feature in alignment with the fuel rod. Additionally, the upper and lower bends (jogs) provide clearance for the opposing strap edges that are extended so that they can carry the spacer grid anti-snag features. Thirdly (3), the strap edge closest to the corner bend has a center "U" notch of material removed from its side where the opposite strap edge inserts. This allows clearance for the opposing strap edge to position/contain a fuel rod support feature. Finally, the strap edge closest to the corner bend (4, 5) extends around the support feature and allows anti-snag features to be accurately placed between fuel rods. These features are labeled with the corresponding numbers in FIGS. 5A, 5B and 5C.

Figure 6:
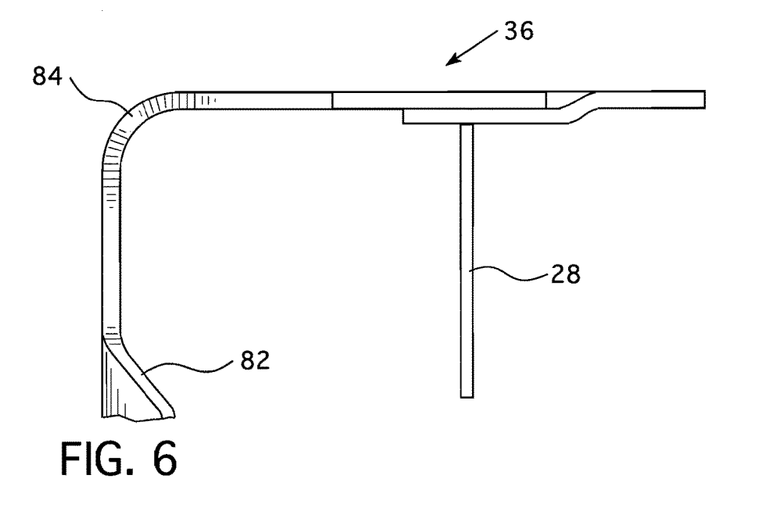
FIG. 6 is a plan view of one corner of the border strap showing the mating joint between the first and second ends of the bordering strap(s) and an interior strap.
Figure 7A:
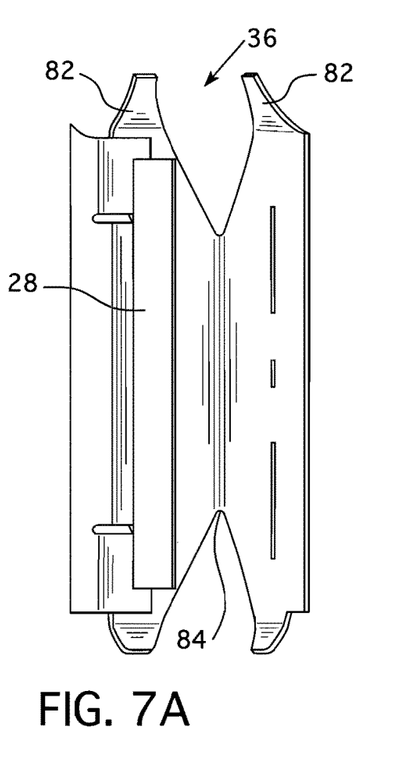
FIGS. 7A, 7B, 7C, 7D and 7E show several rotated view of the location of the weld joint that connects two mating ends of the border strap with an associated inner strap respectively taken at 30 degrees, 15 degrees, 0 degrees, minus 15 degrees and 180 degrees.
Figure 7B:
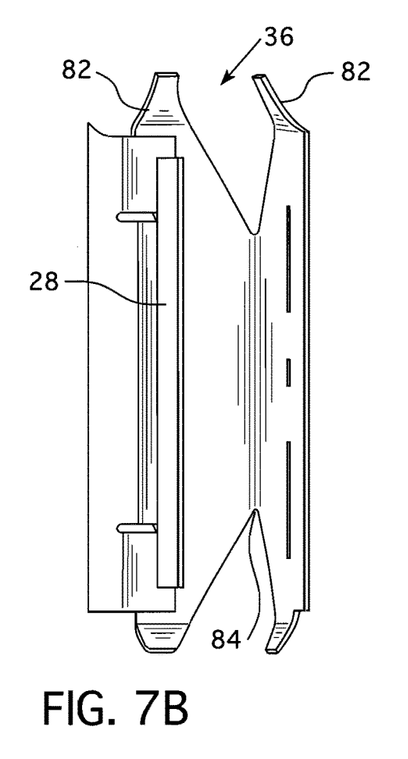
Figure 7C:
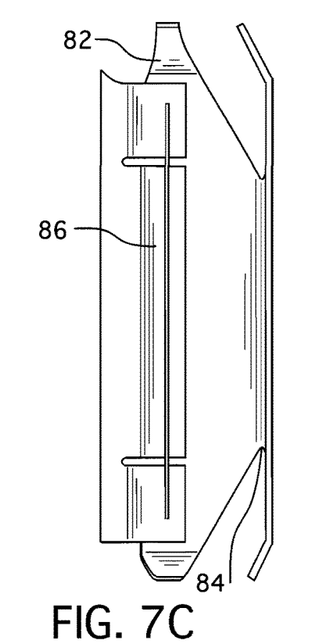
Figure 7D:
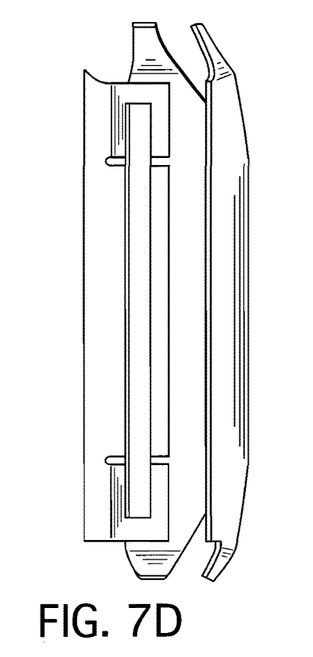
Figure 7E:
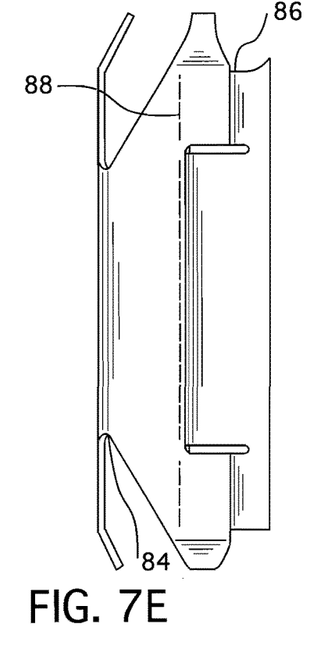
Figure 8:
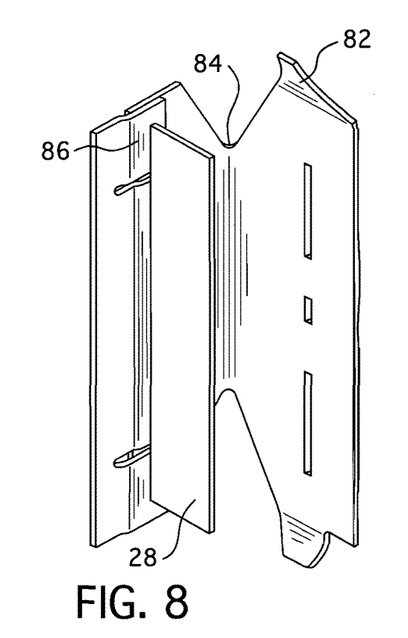
FIG. 8 is a isometric view of the weld joint location illustrated in FIG. 7.

The joint configuration 86 where the opposite strap ends mate with the end of one of the inner straps, lends itself to a seam weld where the weld penetrates the outer strap into the inner strap. FIGS. 7A, 7B, 7C, 7D, 7E and FIG. 8 show several rotated views with the location of the weld joints 88 that connect the two mating outer straps with the associated inner strap shown as a dotted line in FIG. 7E. FIGS. 7A, 7B, 7C, 7D and 7E respectfully show a rotation of the inside of the joint relative to a front view respectively of 30 degrees, 15 degrees, 0 degrees, minus 15 degrees and 180 degrees. FIG. 8 is an isometric view of the inside of the corner 84. The joint configuration resembles a "T" from the top view as can be seen in FIG. 6.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A fuel assembly for a nuclear reactor, the fuel assembly comprising:
   a parallel, spaced array of a plurality of elongated nuclear fuel rods, supported between a lower nozzle and an upper nozzle, and having an axial length along the elongated dimension of the nuclear fuel rods;
   a plurality of spaced support grids arranged in tandem along the axial length of the fuel rods, between the upper nozzle and the lower nozzle, at least partially enclosing an axial portion of a circumference of each fuel rod within a corresponding support cell of the support grids to maintain a lateral spacing between fuel rods, at least one of the support grids comprising:

a plurality of elongated, interior intersecting straps that define interior ones of the support cells at an intersection of each four adjacent, interior, intersecting straps that surround the nuclear fuel rods passing through the interior support cells, with a length of each strap along its elongated dimension, forming a wall of the corresponding support cell, with each side of the support grid having an outer wall of each of an outer row of support cells respectively on a first side, on a second side, on a third side and on a fourth side of the support grid, the outer walls formed from at least one bordering strap, each bordering strap having a first and a second end, the at least one bordering strap includes at least one extended bordering strap, each extended bordering strap having a continuous length extending completely over a length of at least one side of the support grid, the first end of an extended bordering strap extending along one side of the support grid, then around a corner of the support and, and then over at least one support cell of the outer row of support cells of an adjacent side of the support grid, the first end of the extended bordering strap overlapping a second end of a bordering strap on the adjacent side of the support grid, to form an overlapping section of bordering strap ends, the overlapping section mates with an end of one of the interior straps to which it is structurally joined.

2. The fuel assembly of claim 1 wherein the bordering strap covering the first side, the second side, the third side and the fourth side of the support grid is one continuous strap with the first and second end.

3. The fuel assembly of claim 1 wherein the bordering strap includes anti-snag projections that extend from the top and bottom of the bordering strap at regular intervals between fuel rod support features generally centered on a width of the outer wall of the outer row of support cells, except one of the first and second ends has no anti-snag projections in the overlapping section.

4. The fuel assembly of claim 1 wherein the first end is provided with two spaced lateral cuts that are spaced along a height of the first end that define three tabs with a center tab wider than an upper and a lower tab.

5. The fuel assembly of claim 4 wherein the upper and lower tabs are substantially of the same height.

6. The fuel assembly of claim 4 wherein each of the upper, lower and center tabs has a vertical bend line and the vertical bend line of the upper and lower tabs are substantially equidistant from an intersection of the interior strap closest to the first end and the vertical bend line of the center tab is further distant from the intersection than the upper and lower tabs.

7. The fuel assembly of claim 4 wherein the second end includes a generally "U"-shaped notch along its height that is substantially in-line with the center tab.

8. The fuel assembly of claim 7 wherein each of the upper, lower and center tabs has a vertical bend line and the vertical bend line of the upper and lower tabs are substantially equidistant from an intersection of the interior strap closest to the first end and the vertical bend line of the center tab is further distant from the intersection than the upper and lower tabs and the "U"-shaped notch in the second end has a lateral depth substantially equal to the width of the center tab from the first end to the bend line.

9. The fuel assembly of claim 1 wherein an upper and lower edge of a portion of the overlapping section at the second end adjacent where the bordering strap extends around the corner, has an upright and inverted generally "V" shaped cut that is substantially centered at the corner.

10. The fuel assembly of claim 1 wherein the bordering strap includes fuel rod support features generally centered on a width of the outer wall of the outer row of the support cells, except that the distance between the adjacent fuel rod support features at the one of the first and second end that is part of the overlapping section is smaller than the distance between other of the fuel rod support features.

11. A nuclear fuel assembly support grid structured to maintain a spacing between nuclear fuel rods in a parallel, spaced array of a plurality of elongated nuclear fuel rods supported within a nuclear fuel assembly, the nuclear fuel rods having an axial length along the elongated dimension of the nuclear fuel rods and the nuclear fuel assembly support grids being adapted to be supported along a portion of the axial length of the fuel rods, and at least partially enclosing the axial portion of a circumference of each fuel rod within a corresponding support cell of the nuclear fuel assembly support grid, the nuclear fuel assembly support grid comprising:

a plurality of elongated, interior intersecting straps that define interior ones of the support cells at an intersection of each four adjacent, interior, intersecting straps that surround the nuclear fuel rods passing through the interior support cells, with a length of each strap along its elongated dimension, forming a wall of the corresponding support cell, with each side of the support grid having an outer wall of each of an outer row of support cells respectively on a first side, on a second side, on a third side and on a fourth side of the support grid the outer walls formed from at least one bordering strap, each bordering strap having a first and a second end, the at least one bordering strap includes at least one extended bordering strap, each extended bordering strap having a continuous length extending completely over a length of at least one side of the support grid, the first end of an extended bordering strap extending along one side of the support grid, then around a corner of the support grid, and then over at least one support cell of the outer row of support cells of an adjacent side of the support grid, the first end of the extended bordering strap overlapping a second end of a bordering strap on the adjacent side of the support grid, to form an overlapping section of bordering strap ends, the overlapping section mates with an end of one of the interior straps to which it is structurally joined.

12. The fuel assembly support grid of claim 11 wherein the bordering strap covering the first side, the second side, the third side and the fourth side of the support grid is one continuous strap with the first and second end.

13. The fuel assembly support grid of claim 11 wherein the bordering strap includes anti-snag projections that extend from the top and bottom of the bordering strap at regular intervals between fuel rod support features generally centered on a width of the outer wall of the outer row of support cells, except one of the first and second ends has no anti-snag projections in the overlapping section.

14. The fuel assembly support grid of claim 11 wherein the first end is provided with two spaced lateral cuts that are spaced along a height of the first end that define three tabs with a center tab wider than an upper and a lower tab.

15. The fuel assembly support grid of claim 14 wherein the upper and lower tabs are substantially of the same height.

16. The fuel assembly support grid of claim 14 wherein each of the upper, lower and center tabs has a vertical bend line and the vertical bend line of the upper and lower tabs are substantially equidistant from an intersection of the interior strap closest to the first end and the vertical bend line of the center tab is further distant from the intersection than the upper and lower tabs.

17. The fuel assembly support grid of claim 14 wherein the second end includes a generally "U"-shaped notch along its height that is substantially in-line with the center tab.

18. The fuel assembly support grid of claim 17 wherein each of the upper, lower and center tabs has a vertical bend line and the vertical bend line of the upper and lower tabs are substantially equidistant from an intersection of the interior strap closest to the first end and the vertical bend line of the center tab is further distant from the intersection than the upper and lower tabs and the "U"-shaped notch in the second end has a lateral depth substantially equal to the width of the center tab from the first end to the bend line.

19. The fuel assembly support grid of claim 11 wherein an upper and lower edge of a portion of the overlapping section at the second end adjacent where the bordering strap extends around the corner, has an upright and inverted generally "V" shaped cut that is substantially centered at the corner.

20. The fuel assembly support grid of claim 11 wherein the bordering strap includes fuel rod support features generally centered on a width of the outer wall of the outer row of the support cells, except that the distance between the adjacent fuel rod support features at the one of the first and second end that is part of the overlapping section is smaller than the distance between other of the fuel rod support features.

\* \* \* \* \*